(12) United States Patent
Refalo et al.

(10) Patent No.: US 10,539,090 B2
(45) Date of Patent: Jan. 21, 2020

(54) FUEL SYSTEM WITH DEACTIVATING FUEL PUMP

(71) Applicants: Kevin B Refalo, Milford, MI (US); Scott K Fisher, Northville, MI (US)

(72) Inventors: Kevin B Refalo, Milford, MI (US); Scott K Fisher, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 121 days.

(21) Appl. No.: 15/788,231

(22) Filed: Oct. 19, 2017

(65) Prior Publication Data

US 2019/0120165 A1    Apr. 25, 2019

(51) Int. Cl.

| F02D 41/06 | (2006.01) |
| F02D 41/30 | (2006.01) |
| F02D 41/32 | (2006.01) |
| F02D 41/38 | (2006.01) |
| F02M 39/02 | (2006.01) |
| F02D 41/00 | (2006.01) |
| F02D 41/02 | (2006.01) |

(52) U.S. Cl.
CPC ..... *F02D 41/3094* (2013.01); *F02D 41/0087* (2013.01); *F02D 41/0255* (2013.01); *F02D 41/062* (2013.01); *F02D 41/32* (2013.01); *F02D 41/3854* (2013.01); *F02M 39/02* (2013.01); *F02D 2041/389* (2013.01); *F02D 2200/101* (2013.01); *F02D 2200/1002* (2013.01)

(58) Field of Classification Search
CPC ............. F02D 41/0255; F02D 41/3094; F02D 41/3845
See application file for complete search history.

(56) References Cited

U.S. PATENT DOCUMENTS

| 6,196,175 | B1 | 3/2001 | Church |
| 6,814,040 | B2 | 11/2004 | Hendriksma et al. |
| 7,311,087 | B2 | 12/2007 | Shaull et al. |
| 8,061,320 | B2 | 11/2011 | Meisborn |
| 2006/0021598 | A1* | 2/2006 | Nomura ............... F02D 41/3094 123/446 |
| 2007/0006849 | A1* | 1/2007 | Mashiki ................ F02D 41/406 123/457 |
| 2011/0097228 | A1 | 4/2011 | Tokuo et al. |
| 2011/0146143 | A1 | 6/2011 | Alexander |
| 2015/0260064 | A1 | 9/2015 | Majkowski et al. |

* cited by examiner

*Primary Examiner* — Jonathan R Matthias
(74) *Attorney, Agent, or Firm* — Ralph E Smith

(57) ABSTRACT

A fuel delivery system for a vehicle having an engine configured to selectively operate between a port fuel injection (PFI) mode and a gasoline direct injection (GDI) mode includes a PFI fuel rail having a plurality of PFI injectors configured to supply fuel to the engine during the PFI mode, a GDI fuel rail having a plurality of GDI injectors configured to supply fuel to the engine during the GDI mode, a first GDI fuel supply line fluidly coupled to the GDI fuel rail, a first deactivating GDI fuel pump assembly disposed on the first GDI fuel supply line. The first deactivating GDI fuel pump assembly is configured to selectively transition between an activated mode and a deactivated mode.

7 Claims, 5 Drawing Sheets

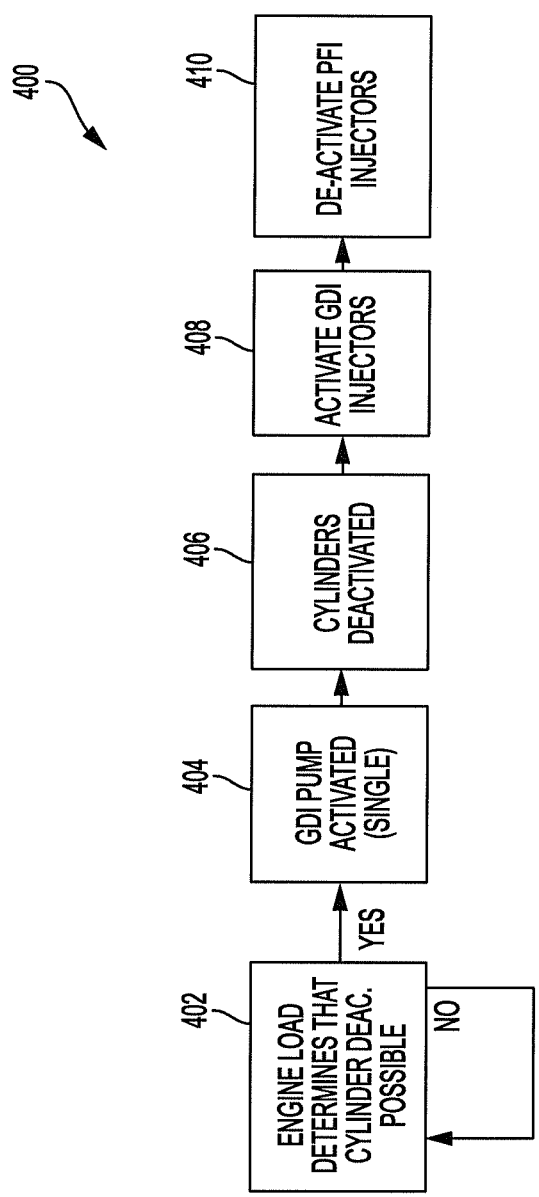

FUEL SYSTEM WITH DEACTIVATING FUEL PUMP

FIELD

The present application relates generally to internal combustion engines and, more particularly, to a deactivating fuel pump system for an engine having gasoline direction injection.

BACKGROUND

Internal combustion engines have traditionally utilized port fuel injection (PFI) fuel delivery technology. PFI engines mix fuel and air in an intake port before the mixture is drawn into the engine cylinders for combustion. This mixing is performed to optimize the combustion and improve engine performance. More recently, gasoline direct injection (GDI) fuel delivery technology has been introduced to provide improved fuel economy. GDI engines draw air into the cylinder during the intake stroke, and fuel is injected directly into the cylinders during the intake or compression stroke to mix with the air. This type of mixing potentially provides improved fuel economy and engine performance under various load conditions. However, both PFI and GDI engines have their own unique advantages and disadvantages when compared to each other. Thus, while such internal combustion engines work well for their intended purpose, it is desirable to provide continuous improvement in the relevant art.

SUMMARY

According to one example aspect of the invention, a fuel delivery system for a vehicle having an engine configured to selectively operate between a port fuel injection (PFI) mode and a gasoline direct injection (GDI) mode is provided. In one exemplary implementation, the system includes a PFI fuel rail having a plurality of PFI injectors configured to supply fuel to the engine during the PFI mode, a GDI fuel rail having a plurality of GDI injectors configured to supply fuel to the engine during the GDI mode, a first GDI fuel supply line fluidly coupled to the GDI fuel rail, a first deactivating GDI fuel pump assembly disposed on the first GDI fuel supply line, The first deactivating GDI fuel pump assembly is configured to selectively transition between an activated mode that pumps fuel to the GDI injectors in the first GDI fuel supply line, and a deactivated mode that does not pump fuel to the GDI injectors in the first GDI fuel supply line.

In addition to the foregoing, the described system may include one or more of the following features: a second GDI fuel supply line fluidly coupled to the GDI fuel rail, and a second deactivating GDI fuel pump assembly disposed on the second GDI fuel supply line, wherein the second deactivating GDI fuel pump assembly is configured to selectively transition between an activated mode that pumps fuel to the GDI injectors in the second GDI fuel supply line, and a deactivated mode that does not pump fuel to the GDI injectors in the second GDI fuel supply line; a controller in signal communication with the PFI injectors, the GDI injectors, and the first and second deactivating GDI fuel pump assemblies, the controller programmed to activate the first and second deactivating GDI fuel pump assemblies to operate in a first GDI mode, activate only one of the first and second deactivating GDI fuel pump assemblies to operate in a second GDI mode, and deactivate the first and second deactivating GDI fuel pump assemblies to operate in the PFI mode; and a controller in signal communication with the PFI injectors, the GDI injectors, and the first and second deactivating GDI fuel pump assemblies, the controller programmed to operate the fuel delivery system in at least one of (i) an engine start mode, (ii) a variable engine speed and load mode, and (iii) a cylinder deactivation mode.

In addition to the foregoing, the described system may include one or more of the following features: wherein in the (i) engine start mode, the controller is programmed to activate a low pressure fuel pump, activate PFI injectors to operate in the PFI mode, activate only one of the first and second deactivating GDI fuel pump assemblies, if a temperature of one or more catalytic converters is below a first predetermined warmup threshold, activate the GDI injectors, if a temperature of the one or more catalytic converters is above a second predetermined threshold, deactivate the activated GDI fuel pump assembly, and deactivate the GDI injectors.

In addition to the foregoing, the described system may include one or more of the following features: wherein in the (ii) variable engine speed and load mode, the controller is programmed to monitor a speed and a load of the engine, if the vehicle engine is transitioning to a low speed-low load mode, deactivate the first and second deactivating GDI fuel pump assemblies, activate the PFI injectors, and deactivate the GDI injectors, if the vehicle engine is transitioning to a low speed-high load mode, activate only one of the first and second deactivating GDI fuel pump assemblies, activate the GDI injectors, and deactivate the PFI injectors, and if the vehicle engine is transitioning to a high speed-high load mode, activate the first and second deactivating GDI fuel pump assemblies, activate the GDI injectors, and deactivate the PFI injectors.

In addition to the foregoing, the described system may include one or more of the following features: wherein in the (iii) cylinder deactivation mode, the controller is programmed to activate only one of the first and second deactivating GDI fuel pump assemblies, deactivate a predetermined number of engine cylinders, activate the GDI injectors, and deactivate the PFI injectors; and wherein each deactivating GDI fuel pump assembly includes a high pressure fuel pump and a deactivating roller tappet assembly.

In addition to the foregoing, the described system may include one or more of the following features: wherein the deactivating roller tappet assembly includes an outer housing, an inner housing slidingly disposed within the outer housing, and a locking assembly configured to move between a locked position where the outer housing is configured to impart movement onto the inner housing to operate the fuel pump, and an unlocked position where the outer housing moves relative to the inner housing without imparting movement onto the inner housing such that the fuel pump is deactivated; and wherein the locking assembly includes a plurality of locking pins movable between the locked position and the unlocked position.

According to another example aspect of the invention, method of controlling a fuel delivery system of a vehicle having an engine configured to selectively operate between a port fuel injection (PFI) mode and a gasoline direct injection (GDI) mode, the fuel system including a plurality of deactivating GDI fuel pump assemblies configured to selectively move between an activated mode that pumps fuel to GDI injectors, and a deactivated mode that does not pump fuel to the GDI injectors is provided. The method includes, In one exemplary implementation, operating in at least one of (i) an engine start mode, (ii) a variable engine speed and load mode, and (iii) a cylinder deactivation mode, wherein (i) the engine start mode, (ii) the variable engine speed and load mode, and (iii) the cylinder deactivation mode each include at least one of the following steps: activating the plurality of deactivating GDI fuel pump assemblies, activating only a portion of the plurality of deactivating GDI fuel pump assemblies, deactivating the plurality of deactivating GDI fuel pump assemblies, and deactivating only a portion of the plurality of deactivating GDI fuel pump assemblies.

In addition to the foregoing, the described method may include one or more of the following features: operating in the engine start mode; and wherein operating in the engine start mode includes activating a low pressure fuel pump, activating PFI injectors to operate in the PFI mode, activating only the portion of the plurality of deactivating GDI fuel pump assemblies, if a temperature of one or more catalytic converters is below a first predetermined warmup threshold, activating the GDI injectors, if a temperature of the one or more catalytic converters is above a second predetermined threshold, deactivating the activated portion of deactivating GDI fuel pump assemblies, and deactivating the GDI injectors.

In addition to the foregoing, the described method may include one or more of the following features: operating in the variable engine speed and load mode; and wherein operating in the variable engine speed and load mode comprises: monitoring a speed and load of the engine, if the vehicle engine is transitioning to a low speed-low load mode, deactivating the plurality of deactivating fuel pump assemblies, activating the PFI injectors, and deactivating the GDI injectors, if the vehicle engine is transitioning to a low speed-high load mode, activating only the portion of the plurality of deactivating GDI fuel pump assemblies, activating the GDI injectors, and deactivating the PFI injectors, and if the vehicle engine is transitioning to a high speed-high load mode, activating the plurality of deactivating GDI fuel pump assemblies, activating the GDI injectors, and deactivating the PFI injectors.

In addition to the foregoing, the described method may include one or more of the following features: operating in the cylinder deactivation mode; and wherein operating in the cylinder deactivation mode includes activating the portion of the plurality of deactivating GDI fuel pump assemblies, deactivating a predetermined number of engine cylinders, activating the GDI injectors, and deactivating the PFI injectors.

According to another example aspect of the invention, a method of controlling a fuel delivery system of a vehicle having an engine configured to selectively operate between a port fuel injection (PFI) mode and a gasoline direct injection (GDI) mode, the fuel system including a plurality of deactivating GDI fuel pump assemblies configured to selectively move between an activated mode that pumps fuel to GDI injectors, and a deactivated mode that does not pump fuel to the GDI injectors, is provided. The method includes (i) operating in an engine start mode including activating a low pressure fuel pump, activating PFI injectors to operate in the PFI mode, activating only a portion of a plurality of deactivating GDI fuel pump assemblies, each deactivating GDI fuel pump assembly including a high pressure fuel pump and a deactivating roller tappet assembly, the deactivating roller tappet assembly comprising an inner housing slidingly disposed within an outer housing, and a locking assembly having a plurality of lock pins hydraulically controlled to move between a locked position where the outer housing is configured to impart movement onto the inner housing to operate the fuel pump, and an unlocked position where the outer housing moves relative to the inner housing without imparting movement onto the inner housing such that the fuel pump is deactivated, if a temperature of one or more catalytic converters is below a first predetermined warmup threshold, activating GDI injectors, if a temperature of the one or more catalytic converters is above a second predetermined threshold, deactivating the activated portion of deactivating GDI fuel pump assemblies, and deactivating the GDI injectors, (ii) operating in a variable engine speed and load mode including monitoring a speed and load of the engine, if the vehicle is transitioning to a low speed-low load mode, deactivating the plurality of deactivating fuel pump assemblies, activating the PFI injectors, and deactivating the GDI injectors, if the vehicle is transitioning to a low speed-high load mode, activating only a portion of the plurality of deactivating GDI fuel pump assemblies, activating the GDI injectors, and deactivating the PFI injectors, and if the vehicle is transitioning to a high speed-high load mode, activating the plurality of deactivating GDI fuel pump assemblies, activating the GDI injectors, and deactivating the PFI injectors, and (iii) operating in a cylinder deactivation mode including activating a portion of the plurality of deactivating GDI fuel pump assemblies, deactivating a predetermined number of engine cylinders, activating the GDI injectors, and deactivating the PFI injectors.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 illustrates yet another example control method of operating the engine shown in FIG. 1, in accordance with the principles of the present disclosure.

DETAILED DESCRIPTION

The present application is generally directed to a fuel delivery system for an engine configured to selectively operate between a port fuel injection (PFI) mode and a gasoline direct injection (GDI) mode. The fuel delivery system changes operational modes depending on vehicle operation to reduce emissions and/or improve fuel economy. The fuel delivery system includes one or more deactivating GDI fuel pump assemblies that are each selectively deactivatable to reduce frictional losses and improve fuel economy.

Figure 1:
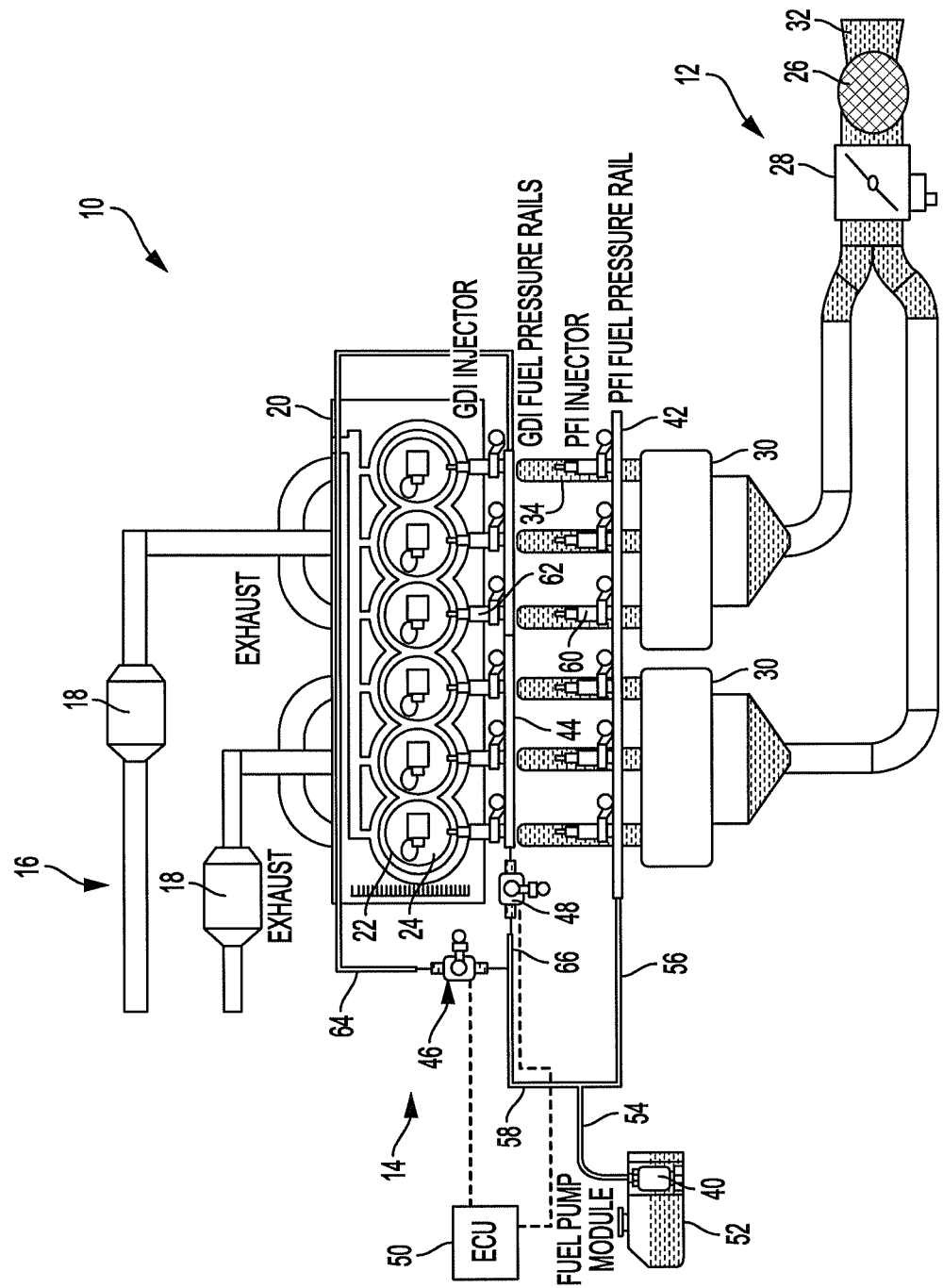
FIG. 1 is a schematic illustration of an engine and fuel delivery system in accordance with the principles of the present disclosure.

With initial reference to FIG. 1, an example internal combustion engine for a vehicle is illustrated and generally identified at reference numeral 10. The internal combustion engine 10 generally includes an air induction system 12, a fuel delivery system 14, and an exhaust system 16.

The engine 10 generally includes a cylinder head and block 20 defining one or more cylinders 22 each receiving a reciprocating piston (not shown) therein. Air and fuel are respectively supplied to combustion chambers 24 of the cylinders 22 via the air induction system 12 and the fuel delivery system 14. The air/fuel mixture is ignited in the combustion chamber 24 and the resulting combustion gas is directed from the chamber 24 to the exhaust system 16.

The air induction system 12 generally includes an air filter 26, a throttle control valve 28, and an intake manifold 30. Air enters the vehicle through an air intake 32 and is filtered in the air filter 26 before being delivered to intake ports 34 of the cylinders 22 for combustion therein.

The fuel delivery system 14 generally includes a low pressure fuel pump 40, a port fuel injection (PFI) fuel pressure rail 42, a gasoline direct injection (GDI) fuel pressure rail 44, a first deactivating GDI fuel pump assembly 46, and a second deactivating GDI fuel pump assembly 48. In the example embodiment, the engine 10 includes a dual function fuel delivery system 14 that is configured to be controlled by an engine control unit (ECU) 50 to selectively operate between a PFI mode or a GDI mode, as described herein in more detail. In general, the engine is operated in the PFI mode during low engine load conditions or when charge motion is low, and operated in the GDI mode when during high engine load conditions or where charge motion is high.

The low pressure fuel pump 40 is disposed within a fuel tank 52 and is configured to supply fuel from the fuel tank 52 to a main fuel delivery line 54. As illustrated, the main fuel delivery line 54 supplies fuel to a PFI fuel delivery line 56 and a GDI fuel delivery line 58. The PFI fuel delivery line 56 is fluidly coupled to the PFI fuel pressure rail 42 to supply the fuel to a plurality of PFI injectors 60. In the example embodiment, PFI injectors 60 are configured to supply fuel to the intake ports 34 where the fuel is mixed with air from the air induction system 12 before being supplied to the combustion chambers 24.

The GDI fuel delivery line 58 is fluidly coupled to the GDI fuel pressure rail 44 to supply the fuel to a plurality of GDI injectors 62. In the example embodiment, GDI injectors 62 are configured to supply fuel directly to the cylinders 22 where the fuel is mixed with air from the air induction system 12 and combusted. Additionally, as shown in FIG. 1, GDI fuel delivery line 58 is split into a first GDI fuel supply line 64 and a second GDI fuel supply line 66 to supply. Each of the first and second fuel supply lines 64, 66 is fluidly coupled to the GDI fuel pressure rail 44 such that an increased supply of fuel can be provided to the GDI injectors 62 when high output is required to meet peak engine power or torque requirements. In one example, first GDI fuel supply line 64 supplies one portion of the GDI injectors 62 (e.g., three), and the second GDI fuel supply line 66 supplies another portion of the GDI injectors 62 (e.g., the remaining three). However, in embodiments with only a single deactivating GDI pump assembly 46, 48, all GDI injectors 62 are supplied by that assembly 46 or 48.

The first deactivating GDI fuel pump assembly 46 is disposed on the first GDI fuel supply line 64 and is configured to be controlled by ECU 50 (or other controller) to selectively operate between an activated mode and a deactivated mode, as described herein in more detail. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the activated mode, the first deactivating GDI fuel pump assembly 46 supplies fuel from the GDI fuel delivery line 58, through the first GDI fuel supply line 64, to the GDI fuel pressure rail 44 and GDI injectors 62. In the deactivated mode, the fuel pump assembly 46 is deactivated and does not supply fuel to the GDI fuel pressure rail 44 through the first GDI fuel supply line 64. However fuel pump module 40 can still provide some fuel through supply line 64.

The second deactivating GDI fuel pump assembly 48 is disposed on the second GDI fuel supply line 66 and is configured to be controlled by ECU 50 (or other controller) to selectively operate between an activated mode and a deactivated mode, similar to the first deactivating GDI fuel pump assembly 46. In the activated mode, the second deactivating GDI fuel pump assembly 46 supplies fuel from the GDI fuel delivery line 58, through the second GDI fuel supply line 66, to the GDI fuel pressure rail 44 and GDI injectors 62. In the deactivated mode, the fuel pump assembly 48 is deactivated and does not supply fuel to the GDI fuel pressure rail 44 through the second GDI fuel supply line 66. However fuel pump module 40 can still provide some fuel through supply line 66.

Figure 2:
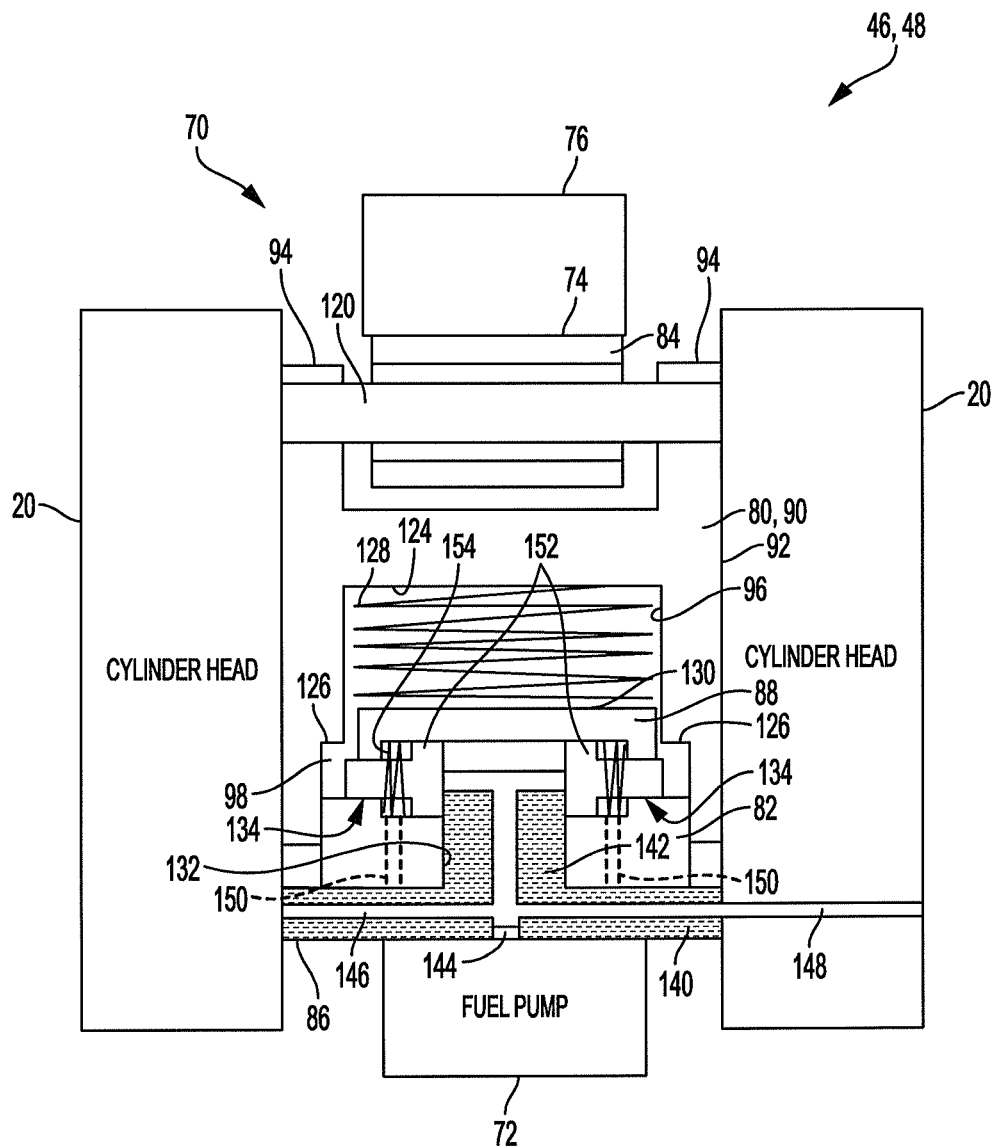
FIG. 2 is a schematic illustration of a deactivating fuel pump tappet that may be used in the system shown in FIG. 1, in accordance with the principles of the present disclosure.

FIG. 2 illustrates the first deactivating GDI fuel pump assembly 46 in greater detail. It will be appreciated that the second deactivating GDI fuel pump assembly 48 may have the same or substantially similar construction. In the example embodiment, the deactivating fuel pump assembly 46 is disposed within a bore 68 of the cylinder head 20 and generally includes a deactivating roller tappet assembly 70 to drive a fuel pump 72.

A lobe or cam 74 is coupled to a rotatable camshaft 76 and is configured to drive the roller tappet assembly 70 to thereby drive the fuel pump 72. In one example, the rotatable camshaft is driven by the engine 10. However, unlike typical roller tappet assemblies that are always mechanically coupled to the camshaft 76 and thus always operating, the deactivating roller tappet assembly 70 can be mechanically decoupled from the camshaft 76 and absorb motion therefrom without transferring that motion to the fuel pump 72, as described herein in more detail.

As illustrated in FIG. 2, in the example embodiment, deactivating roller tappet assembly 70 generally includes an outer housing 80, an inner housing 82, a roller 84, an end cap 86, and a locking assembly 88.

The outer housing 80 includes a generally cylindrical body 90 having an outer diameter or outer surface 92, a pair of arms or flanges 94, and an inner wall 96 defining an inner chamber 98. The outer housing 80 is configured to be inserted into the cylinder head 20 such that outer surface 92 abuts with or is proximate to the walls defining bore 68. Flanges 94 each include an aperture 100 configured to receive one end of a shaft or pin 120, which receives a bearing 122 and the roller 84. The inner wall 96 includes a spring seat surface 124 and a shoulder portion 126. The inner chamber 98 is configured to receive a lost motion mechanism 128 (e.g., a lost motion spring) disposed between the spring seat surface 124 and the inner housing 82.

The inner housing 82 is slidingly disposed within at least a portion of the outer housing inner chamber 98. The inner housing 82 includes a spring seat surface 130, an inner bore 132, and a pair of slots or apertures 134. One end of the lost motion mechanism 128 is configured to seat against the spring seat surface 130, and the inner bore 132 is configured to receive at least a portion of the end cap 86 and locking assembly 88. The apertures 134 are configured to receive at least a portion of the locking assembly 88, as described herein in more detail. Although shown with the pair of apertures 134, it will be appreciated that inner housing 82 may include any suitable number of apertures 134 to accommodate the locking assembly 88.

The end cap 86 includes an outer portion 140, an insertion portion 142, and a plug 144. The end cap 86 includes oil channels 146 configured to receive a supply of oil or other hydraulic fluid from a hydraulic fluid feed channel 148 formed in the cylinder head 20. In an alternative embodiment, oil channels 150 (shown in phantom) may be formed in the inner housing 82 and are fluidly coupled to the end cap oil channels 146.

In the example embodiment, the locking assembly 88 includes a pair of lock pins 152 each having a biasing mechanism 154 (e.g., a spring). The lock pins 152 are disposed within the inner housing inner bore 132 and at least partially extend into respective apertures 134. The biasing mechanisms 154 bias the lock pins 152 into a normally retracted, unlocked position shown in FIG. 2. In the unlocked position, the outer housing 80 is free to move downward (as shown in FIG. 2) toward the end cap 86 without contacting and/or imparting any movement to the inner housing 82. In this unlocked position, the fuel pump 72 is deactivated and does not supply fuel to the GDI injectors 62. Although described in a particular manner, locking assembly 88 may have any suitable construction that enables selective locking and unlocking between the outer and inner housings 80, 82.

To activate the fuel pump 72, a pressurized hydraulic fluid is supplied to feed channel 148 and into the end cap oil channels 146. The pressurized hydraulic fluid acts on the lock pins 152 to overcome the biasing force of biasing mechanisms 154, thereby forcing the lock pins 152 outward toward the outer housing 80 and into a locked position (not shown). In the locked position, lock pins 152 are located in the path of inner wall shoulder portion 126. In the locked position, the outer housing 80 moves downward (as shown in FIG. 2) due to movement of the cam 74 through the roller 84. However, unlike the unlocked position where the lost motion mechanism 128 absorbs movement of the outer housing 80 without moving the inner housing 82, the shoulder portion 126 contacts the lock pins 152. This transfer of motion imparts the downward movement onto the inner housing 82, thereby causes the fuel pump 72 to operate. In this locked position, the fuel pump 72 is activated and supplies fuel to the GDI injectors 62.

Figure 3:
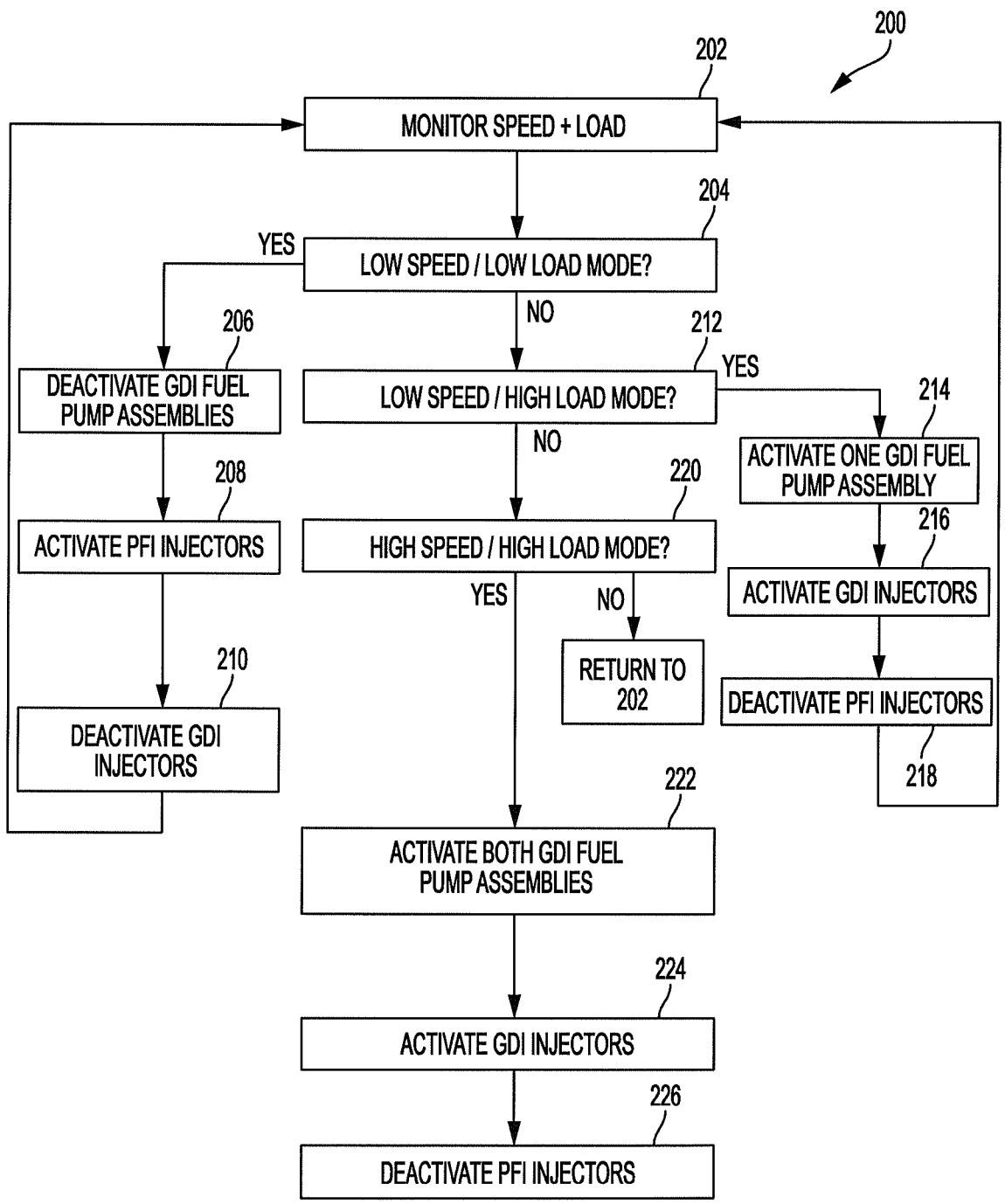
FIG. 3 illustrates example control methods of operating the engine shown in FIG. 1, in accordance with the principles of the present disclosure.
Figure 4:
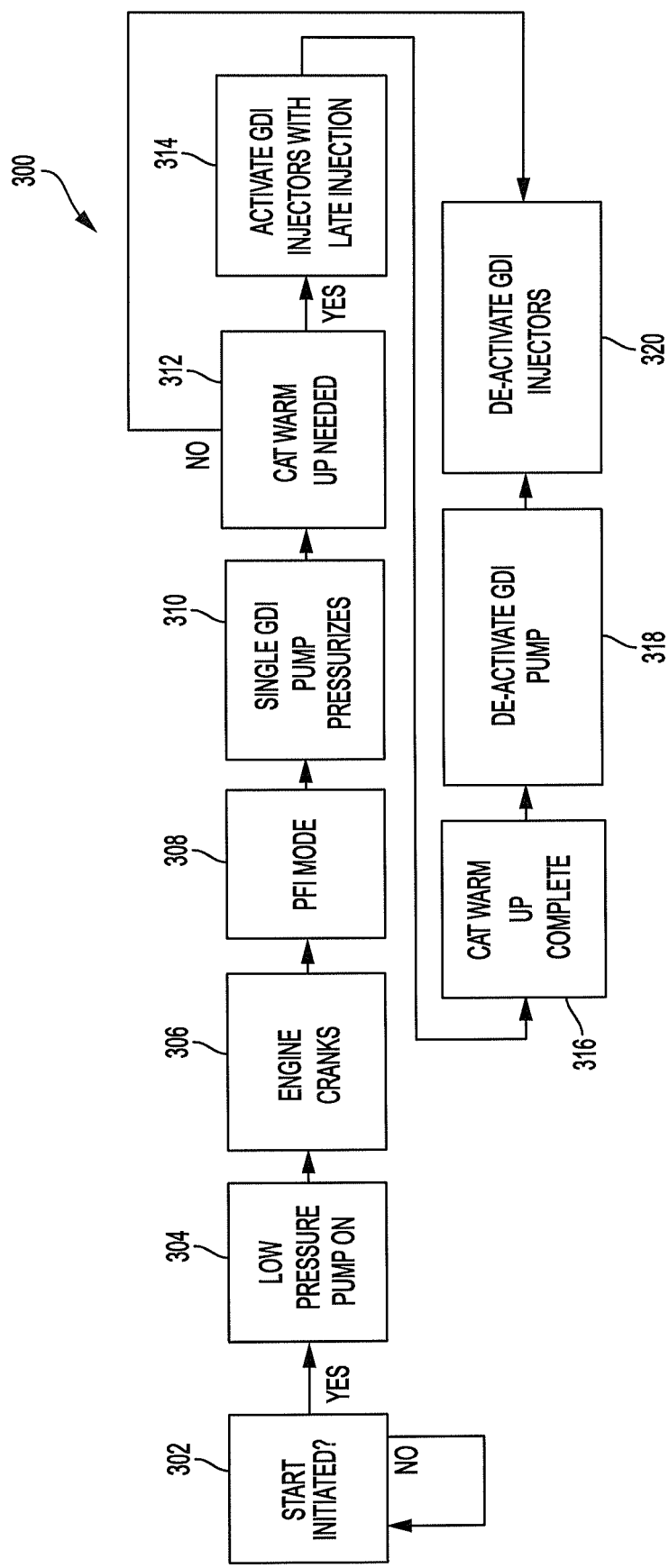
FIG. 4 illustrates another example control method of operating the engine shown in FIG. 1, in accordance with the principles of the present disclosure.

With further reference to FIGS. 3-5, the engine 10, equipped with both PFI and GDI operational capabilities, is configured to operate in various modes to selectively improve vehicle emissions, fuel economy, and/or engine power output. In the example embodiment, engine 10 is configured to operate in a first or variable speed/variable load mode 200, a second or engine start mode 300, and a third or cylinder deactivation mode 400.

FIG. 3 illustrates example method 200 of controlling fuel delivery system 14 in the variable speed/load mode (e.g., varying speed and throttle or torque). Control begins at step 202 by monitoring the speed and load of engine 10. Control proceeds to step 204 and determines if the vehicle is transitioning to a low speed, low load mode where the engine speed is decreasing and engine load is low (e.g., less than 50% max torque). If no, control proceeds to step 212. If it is determined the engine speed is decreasing and the engine load is low, at step 206, ECU 50 deactivates both high pressure deactivating GDI fuel pump assemblies 46, 48. At step 208, ECU 50 activates the PFI injectors 60. At step 210, ECU 50 deactivates the GDI injectors 62. Control then returns to step 202.

This direct injection control (steps 204 to 210) is configured to improve low speed, low load engine emissions by switching the operation from GDI mode to the PFI mode, and improves fuel economy by deactivating both GDI fuel pump assemblies 46, 48 (e.g., reduces frictional losses from constantly operating the pumps).

At step 212, the control determines if the vehicle is transitioning to a low speed, high load mode where the engine speed is low (e.g., less than 70% max rated speed where fuel flow demand increases) and engine load is increasing (vehicle acceleration). If no, control proceeds to step 220. If it is determined the engine load is increasing and engine speed is low, at step 214, ECU 50 activates a single high pressure, deactivating GDI fuel pump assembly 46, 48. At step 216, ECU 50 activates the GDI injectors 62. At step 218, ECU 50 deactivates PFI injectors 60. Control then returns to step 202.

This direct injection control (steps 212 to 218) is configured to improve low speed, high load engine emissions with direct injection (no enrichment), provide higher torque and better spark advance, and only requires a single high pressure fuel pump assembly 46, 48 due to a lower flow requirement, thereby providing a frictional loss advantage over operating two fuel pump assemblies 46, 48.

At step 220, the control determines if the vehicle is transitioning to a high speed, high load mode where the engine load and the engine speed (acceleration) are increasing. If no, control returns to step 202. If it is determined the engine speed and the engine load are increasing, at step 222, ECU 50 activates both high pressure deactivating GDI fuel pump assemblies 46, 48. In configurations with only one pump assembly 46, 48, step 222 includes activating the single high pressure deactivating GDI fuel pump assembly 46 or 48. At step 224, ECU 50 activates the GDI injectors 62. At step 226, ECU 50 deactivates the PFI injectors 60. Control then returns to step 202 or may proceed to another control method such as method 400 described below.

This direct injection control (steps 220 to 226) is configured to improve high speed, high load engine emissions with direct injection (no enrichment), provide higher torque and better spark advance, and provide a maximum flow and pressure when the fuel system 14 requires, for example, during high speed racing events.

FIG. 4 illustrates an example method 300 of controlling fuel delivery system 14 in an engine startup mode. The control begins at step 302 by determining if a vehicle engine startup is initiated. If no, control returns to step 302. If it is determined the vehicle engine 10 startup is initiated, at step 304, ECU 50 activates low pressure fuel pump 40. At step 306, ECU 50 cranks the engine 10. At step 308, ECU 50 operates in PFI mode and activates the PFI injectors 60. At step 310, ECU 50 activates one of GDI fuel pump assemblies 46, 48.

At step 312, ECU 50 determines if CAT (catalytic converter) warmup is needed. For example, ECU 50 determines if a temperature of one or more catalytic converters 18 (FIG. 1) is below a predetermined threshold. If no, control proceeds to step 320. If catalytic converter warmup is needed, at step 314, ECU 50 activates the GDI injectors 62 and performs a late injection (e.g., near or after top-dead-center firing stroke). At step 316, ECU 50 determines if the catalytic converter warmup is complete. For example, ECU 50 determines if a temperature of the catalytic converter 18 exceeds a predetermined threshold.

If the catalytic converter warmup is complete, at step 318, ECU 50 deactivates the activated GDI fuel pump assembly 46, 48. At step 320, ECU 50 deactivates GDI injectors 62. Control may then proceed to another control, such as, for example, the above described control method 200.

The engine start control method 300 is configured to provide faster starting time by first operating in the PFI mode, lower emissions on cranking by operating in the PFI mode, fast catalyst light off with DI late injection, disabled direction injection when cold idling for improved engine emissions, and elimination or reduction of low speed idle noise that can occur with some DI systems.

FIG. 5 illustrates example method 400 of controlling fuel delivery system 14 in a cylinder deactivation mode where the engine 10 transitions from a full cylinder mode to a partial cylinder mode (e.g., six cylinders to three cylinders). The control begins at step 402 where ECU 50 determines if a cylinder deactivation is initiated. If no, control returns to step 402. If it is determined a cylinder deactivation mode is initiated, at step 404, ECU 50 activates a single GDI fuel pump assembly 46, 48. At step 406, ECU 50 deactivates a predetermined number of cylinders 22. At step 408, ECU 50 activates GDI injectors 62. At step 410, ECU 50 deactivates PFI injectors 60. Control then returns to step 402 or another control such as method 200.

The cylinder deactivation control method 400 is configured to provide improved emissions during low speed, high load (cylinder deactivation) operation due to direct injection (no enrichment), higher torque and better spark advance with direct injection, and only requires a single high pressure fuel pump assembly 46, 48 due to a lower flow requirement, thereby providing a frictional loss advantage over operating two fuel pump assemblies 46, 48.

Described herein are systems and methods for a fuel delivery system for an internal combustion engine. The engine and fuel delivery system are configured to selectively operate between a PR mode and a GDI mode. The fuel delivery system includes one or more high pressure deactivating GDI fuel pump assemblies. The two deactivating GDI fuel pump assemblies are utilized simultaneously to provide peak power/torque output in high demand operations. However, one or more of the deactivating GDI fuel pump assemblies can be deactivated to reduce frictional losses and improve fuel economy.

Moreover, the fuel delivery system operates in various modes depending on the condition or operating mode of the vehicle/engine. For example, the fuel delivery system transitions between PFI and GDI modes in a unique control when the vehicle/engine is operating in an engine start mode, a varying speed/varying load mode, and a cylinder deactivation mode. This enables the vehicle to efficiently change operation to quickly prioritize reduced emissions or fuel economy.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A fuel delivery system for a vehicle having an engine configured to selectively operate between a port fuel injection (PFI) mode and a gasoline direct injection (GDI) mode, the system comprising:
    a PFI fuel rail having a plurality of PFI injectors configured to supply fuel to the engine during the PFI mode;
    a GDI fuel rail having a plurality of GDI injectors configured to supply fuel to the engine during the GDI mode;
    a first GDI fuel supply line fluidly coupled to the GDI fuel rail;
    a first deactivating GDI fuel pump assembly disposed on the first GDI fuel supply line;
    wherein the first deactivating GDI fuel pump assembly is configured to be selectively transitioned between an activated mode that pumps fuel to the GDI injectors in the first GDI fuel supply line, and a deactivated mode that does not pump fuel to the GDI injectors in the first fuel supply line;
    a second GDI fuel supply line fluidly coupled to the GDI fuel rail;
    a second deactivating GDI fuel pump assembly disposed on the second GDI fuel supply line,
    wherein the second deactivating GDI fuel pump assembly is configured to be selectively transitioned between an activated mode that pumps fuel to the GDI injectors in the second GDI fuel supply line, and a deactivated mode that does not pump fuel to the GDI injectors in the second GDI fuel supply line; and
    a controller in signal communication with the PFI injectors, the GDI injectors, and the first and second deactivating GDI fuel pump assemblies, the controller programmed to operate the fuel delivery system in at least one of (i) an engine start mode, (ii) a variable engine speed and load mode, and (iii) a cylinder deactivation mode;
    wherein when operating in the (i) engine start mode, the controller is programmed to:
        activate a low pressure fuel pump;
        activate the PFI injectors to operate in the PFI mode;
        activate only one of the first and second deactivating GDI fuel pump assemblies;
        if a temperature of one or more catalytic converters is below a first predetermined warmup threshold, activate the GDI injectors;
        if a temperature of the one or more catalytic converters is above a second predetermined threshold, deactivate the activated GDI fuel pump assembly; and
        deactivate the GDI injectors;
    wherein when operating in the (ii) variable engine speed and load mode, the controller is programmed to:
        monitor a speed and a load of the engine;
        if the vehicle engine is transitioning to a low speed-low load mode, deactivate the first and second deactivating GDI fuel pump assemblies, activate the PFI injectors, and deactivate the GDI injectors;
        if the vehicle engine is transitioning to a low speed-high load mode, activate only one of the first and second deactivating GDI fuel pump assemblies, activate the GDI injectors, and deactivate the PFI injectors; and
        if the vehicle engine is transitioning to a high speed-high load mode, activate the first and second deactivating GDI fuel pump assemblies, activate the GDI injectors, and deactivate the PFI injectors; and wherein when operating in the (iii) cylinder deactivation mode, the controller is programmed to:
  activate only one of the first and second deactivating GDI fuel pump assemblies;
  deactivate a predetermined number of engine cylinders;
  activate the GDI injectors; and
  deactivate the PFI injectors.

2. The system of claim 1, wherein the controller is further programmed to:
  activate the first and second deactivating GDI fuel pump assemblies to operate in a first GDI mode;
  activate only one of the first and second deactivating GDI fuel pump assemblies to operate in a second GDI mode; and
  deactivate the first and second deactivating GDI fuel pump assemblies to operate in the PFI mode.

3. The system of claim 1, wherein each deactivating GDI fuel pump assembly includes a high pressure fuel pump and a deactivating roller tappet assembly.

4. The system of claim 3, wherein the deactivating roller tappet assembly comprises:
  an outer housing;
  an inner housing slidingly disposed within the outer housing; and
  a locking assembly configured to move between a locked position where the outer housing is configured to impart movement onto the inner housing to operate the fuel pump, and an unlocked position where the outer housing moves relative to the inner housing without imparting movement onto the inner housing such that the fuel pump is deactivated.

5. The system of claim 4, wherein the locking assembly includes a plurality of locking pins movable between the locked position and the unlocked position.

6. A method of controlling a fuel delivery system of a vehicle having an engine configured to selectively operate between a port fuel injection (PFI) mode and a gasoline direct injection (GDI) mode, the fuel system including a plurality of deactivating GDI fuel pump assemblies configured to selectively move between an activated mode that pumps fuel to GDI injectors, and a deactivated mode that does not pump fuel to the GDI injectors, the method comprising:
  operating in at least one of (i) an engine start mode, (ii) a variable engine speed and load mode, and (iii) a cylinder deactivation mode, wherein (i) the engine start mode, (ii) the variable engine speed and load mode, and (iii) the cylinder deactivation mode each include at least one of the following steps:
  activating the plurality of deactivating GDI fuel pump assemblies;
  activating only a portion of the plurality of deactivating GDI fuel pump assemblies;
  deactivating the plurality of deactivating GDI fuel pump assemblies; and
  deactivating only a portion of the plurality of deactivating GDI fuel pump assemblies;
  wherein operating in the engine start mode comprises:
    activating a low pressure fuel pump;
    activating PFI injectors to operate in the PFI mode;
    activating only the portion of the plurality of deactivating GDI fuel pump assemblies;
    if a temperature of one or more catalytic converters is below a first predetermined warmup threshold, activating the GDI injectors;
    if a temperature of the one or more catalytic converters is above a second predetermined threshold, deactivating the activated portion of deactivating GDI fuel pump assemblies; and
    deactivating the GDI injectors;
  wherein operating in the variable engine speed and load mode comprises:
    monitoring a speed and load of the engine;
    if the vehicle engine is transitioning to a low speed-low load mode, deactivating the plurality of deactivating fuel pump assemblies, activating the PFI injectors, and deactivating the GDI injectors;
    if the vehicle engine is transitioning to a low speed-high load mode, activating only the portion of the plurality of deactivating GDI fuel pump assemblies, activating the GDI injectors, and deactivating the PFI injectors; and
    if the vehicle engine is transitioning to a high speed-high load mode, activating the plurality of deactivating GDI fuel pump assemblies, activating the GDI injectors, and deactivating the PFI injectors; and
  wherein operating in the cylinder deactivation mode comprises:
    activating the portion of the plurality of deactivating GDI fuel pump assemblies;
    deactivating a predetermined number of engine cylinders;
    activating the GDI injectors; and
    deactivating the PFI injectors.

7. The method of claim 6, wherein each deactivating GDI fuel pump assembly including a high pressure fuel pump and a deactivating roller tappet assembly, the deactivating roller tappet assembly comprising an inner housing slidingly disposed within an outer housing, and a locking assembly having a plurality of lock pins hydraulically controlled to move between a locked position where the outer housing is configured to impart movement onto the inner housing to operate the fuel pump, and an unlocked position where the outer housing moves relative to the inner housing without imparting movement onto the inner housing such that the fuel pump is deactivated.

* * * * *